United States Patent Office 2,722,299
Patented Nov. 1, 1955

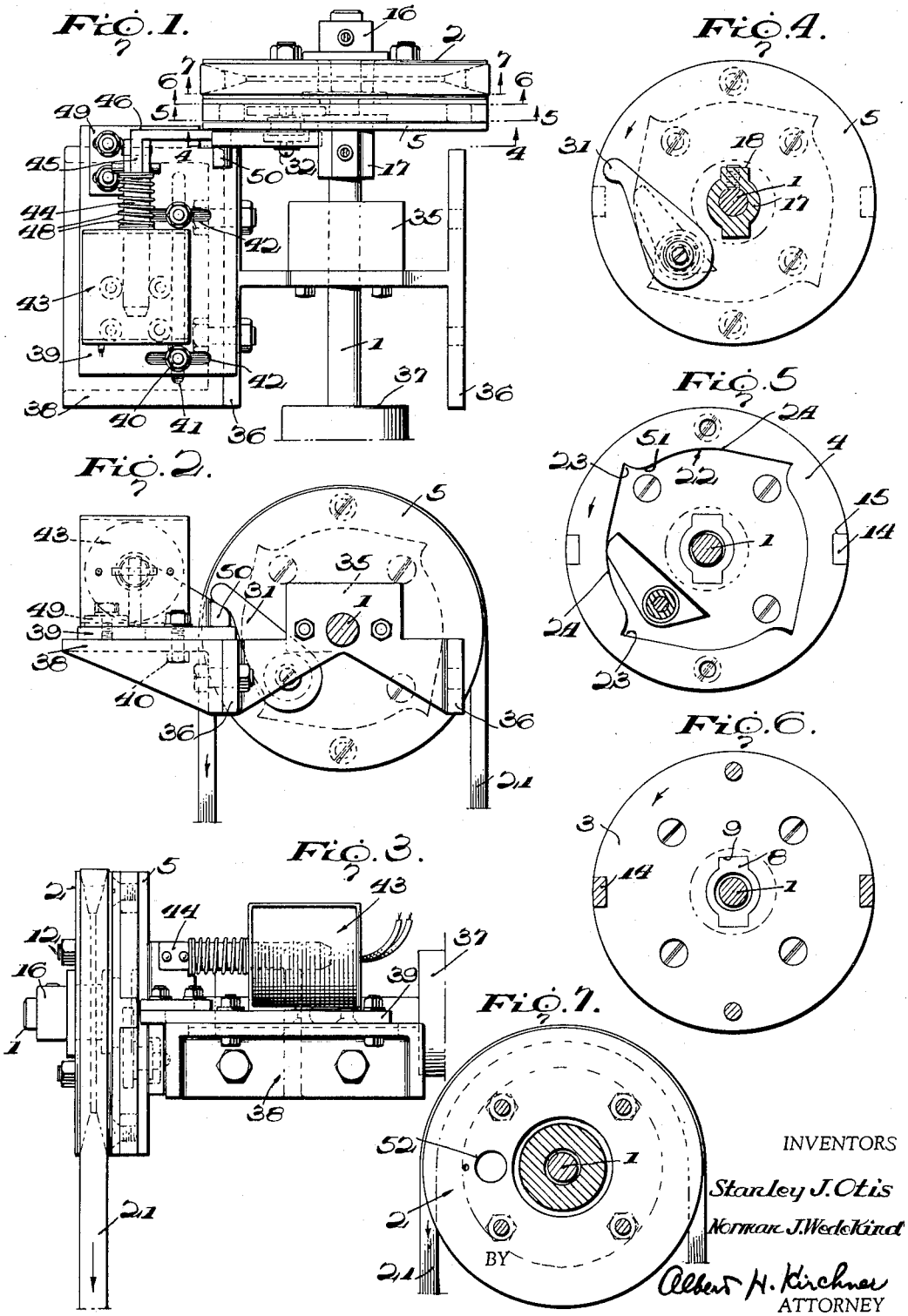

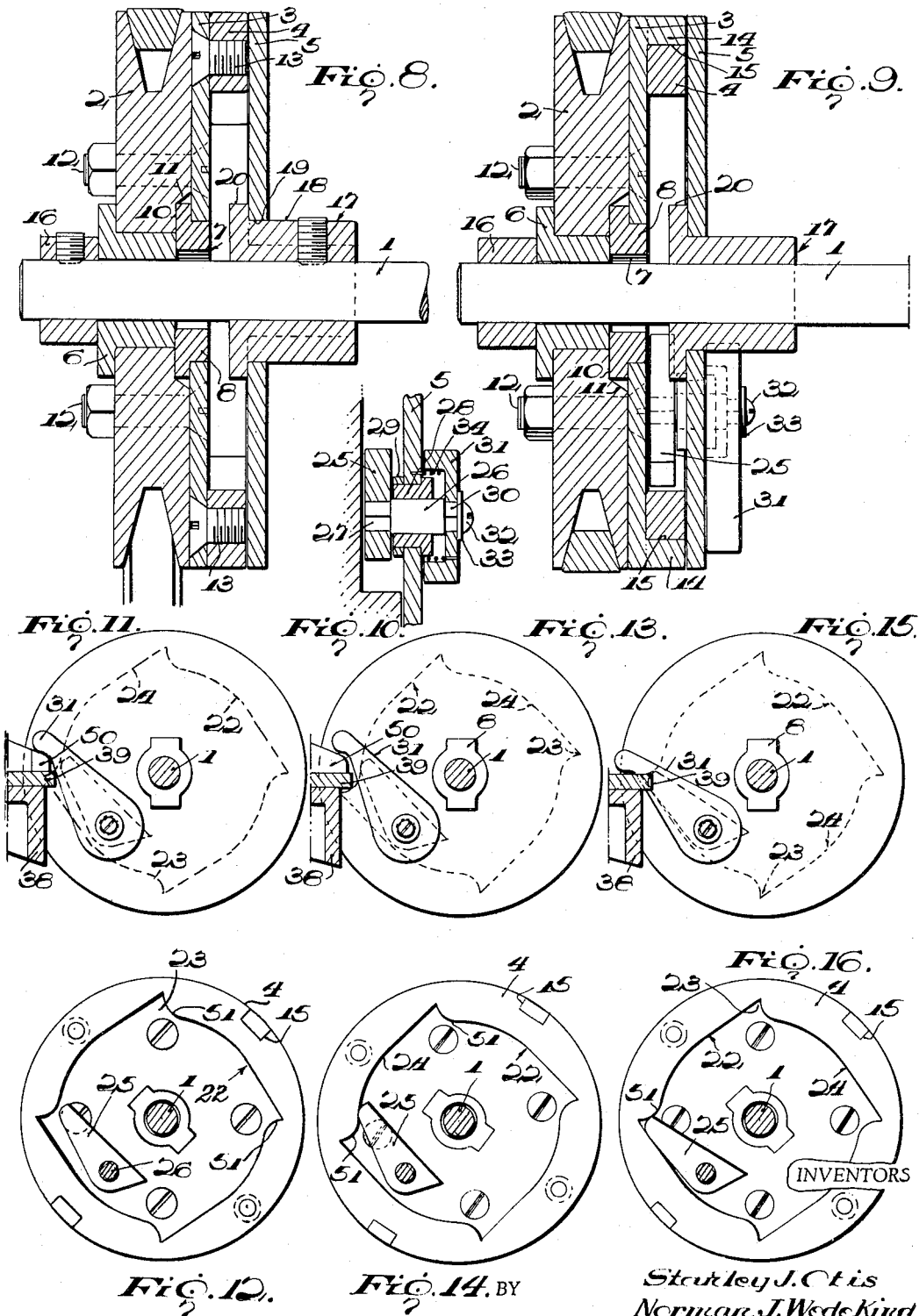

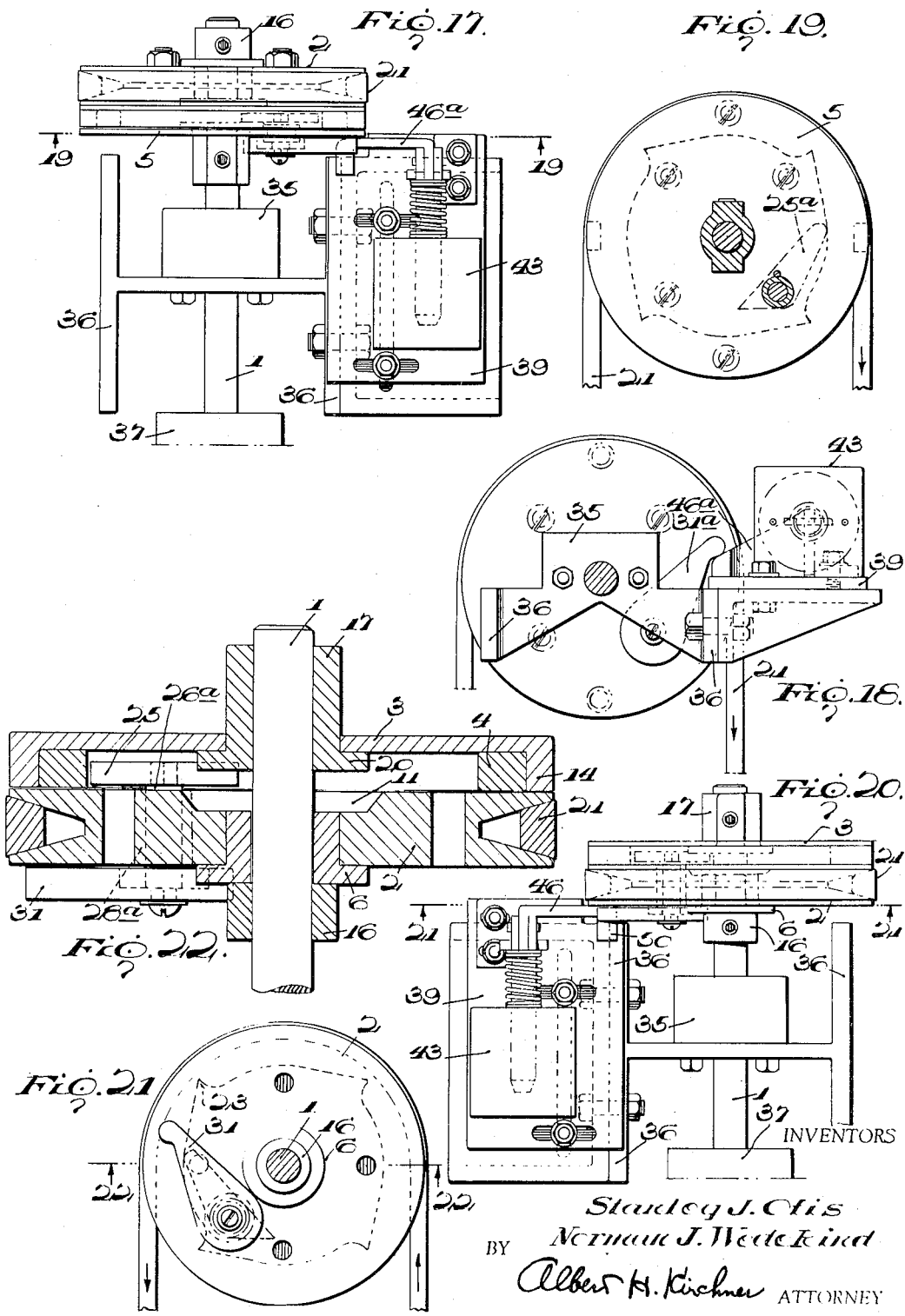

2,722,299

CLUTCH MECHANISM

Stanley J. Otis, Madison, and Norman J. Wedekind, Baraboo, Wis.

Application November 24, 1950, Serial No. 197,482

13 Claims. (Cl. 192—26)

The present invention relates to clutches and actuating means therefor, and its principal objects are to provide a simple, inexpensive, compact and dependable mechanism by which relatively low speed driving and driven members may be coupled and uncoupled by simple, sensitive actuating means which may if desired be remotely controlled.

Other objects are concerned with providing a clutch mechanism capable of transmitting heavy torque and yet be capable of being uncoupled by a minimum of force which may be supplied by electrical means of low power.

Further objects are to adapt the clutch parts to reversal of the direction of drive or of the relationship of the driving and driven members with a minimum of adjustment and substitution of parts.

Another object is to provide a clutch which is well adapted to have as its driving or driven member a pulley or sprocket wheel selected from a considerable range of sizes all of which are readily interchangeable in the mechanism.

Incidental objects are concerned with relating the parts in such a way as to facilitate lubrication, cleaning and replacement.

The foregoing and other objects and advantages are accomplished by a mechanism incorporating the novel principles pointed out in the appended claims, a preferred embodiment being illustrated in the accompanying drawings in which:

Figure 1 is a top plan view;

Fig. 2 is a rear end elevational view;

Fig. 3 is an outside elevational view;

Fig. 4 is a cross-sectional view taken on the line 4—4 of Fig. 1;

Fig. 5 is a cross-sectional view taken on the line 5—5 of Fig. 1;

Fig. 6 is a cross-sectional view taken on the line 6—6 of Fig. 1;

Fig. 7 is a cross-sectional view taken on the line 7—7 of Fig. 1;

Fig. 8 is a longitudinal sectional view taken through the shaft, along one diameter of the clutch;

Fig. 9 is a similar longitudinal sectional view taken through the shaft, along another diameter of the clutch, ninety degrees displaced from the Fig. 8 view;

Fig. 10 is a detail cross-sectional view taken through the pawl plate, pawl and tripping finger;

Fig. 11 is a cross-sectional view taken through the shaft showing the pawl plate with the tripping finger being moved from driving or clutched position to idling or unclutched position;

Fig. 12 is a similar cross-sectional view showing the corresponding position of the pawl;

Fig. 13 is a cross-sectional view taken through the shaft showing the pawl plate after rotation a few degrees beyond Fig. 11 position with the tripping finger raised above the actuating arm;

Fig. 14 is a similar cross-sectional view showing the position of the pawl when the parts are in the position shown in Fig. 13;

Fig. 15 is a cross-sectional view taken through the shaft showing the pawl plate with the tripping finger in driving or clutched position;

Fig. 16 is a similar cross-sectional view showing the position of the pawl in driving or clutched position.

Fig. 17 is a top plan view similar to that of Fig. 1 but showing the parts arranged for rotation in the opposite direction;

Fig. 18 is a rear end elevational view of the arrangement shown in Fig. 17;

Fig. 19 is a cross-sectional view taken on the line 19—19 of Fig. 17;

Fig. 20 is a top plan view similar to that of Fig. 1 but showing the device arranged with the pulley as the driven member;

Fig. 21 is a cross-sectional view taken on the line 21—21 of Fig. 20; and

Fig. 22 is a cross-sectional view taken on the line 22—22 of Fig. 21.

In the embodiment of the invention shown in Figs. 1–16, the numeral 1 designates a shaft on which are mounted a pulley 2, a pulley face plate 3, a cam plate 4, and a pawl plate 5, all in face to face engagement axially of the shaft, as shown in Fig. 8. The pulley is press fitted in a flanged hub 6 and the face plate is similarly press fitted on a hub 7 having on one side radial lugs 8 which stand in corresponding recesses 9 in the face plate and having on its other side a circular radial flange 10 which is accommodated in a shallow counterbore 11 in the adjacent face of the pulley. Both hubs are journaled for free rotation on the shaft, and the face plate and cam plate are assembled with the pulley by bolts 12 securing the face plate to the pulley and by screws 13 which fasten the pawl plate to the face plate. Shouldered lugs 14 project radially from the face plate 3 into recesses 15 cut into the periphery of the cam plate 4 so as further to connect these two plates and provide good driving or torque-transmitting connection.

A collar 16 is fixed on the shaft 1 as by a setscrew to bear against the end face of the pulley hub 6 and prevent axial sliding of the pulley, face plate and cam plate assembly to the left as viewed in Fig. 8, and a pawl plate hub 17, on which the pawl plate makes a drive fit, is setscrewed or otherwise made fast on the shaft to prevent axial sliding of the pawl plate, and hence of the assembly also, to the right as viewed in Fig. 8. The pawl plate has radial lugs 18 seated in corresponding recesses 19 in the pawl plate and a radial circular flange 20 standing behind the pawl plate, or to the left thereof as viewed in Fig. 8, being accommodated in the open central portion of the cam plate.

Thus the assembly of pulley, face plate and cam plate, hereinafter called the pulley assembly, is freely rotatably mounted on the shaft, and the pawl plate is fast on the shaft. The pulley assembly and pawl plate are the respective clutch members which when connected by the means and in the manner hereinafter to be explained will result in the clutch being engaged and when unconnected will cause the clutch to be disengaged. Assuming the pulley is driven, as by the belt 21, the pulley assembly is the driving member, and the pawl plate 5 is the driven member which, when coupled to the pulley assembly, will transmit drive to the shaft 1.

The cam plate 4, as best shown in Fig. 5, is centrally open, the opening being defined by a cam track or contour 22 of special shape, including a plurality of angularly shouldered depressed pockets 23, say four in number, spaced equidistantly around the track and connected by intervening raised dwells 24 which are arcuate portions of the track having their centers in the axis of the shaft 1.

A pawl 25 is mounted on the pawl plate 5 by a pivot pin 26 standing through the pawl plate in such a way that the pawl is accommodated in the central opening in the cam plate 4 and the nose end of the pawl, opposite its pivoted end, may be swung into any of the shouldered pockets 23 so as to be caught in driving engagement thereby or may be swung oppositely through a small angle so as to ride on the dwells 24, in the positions shown respectively by Figs. 16 and 14. The pin 26 functions to swing the pawl, and for this purpose its inner end portion 27 which mounts the pawl is made square or otherwise polygonal in cross section and snugly fits a correspondingly shaped socket or opening in the pawl. The mid portion of the pin is cylindrical and is sleeved with a bushing 28 journaled in a circular opening in the pawl plate 5. This bushing may be flanged on the outer side of the pawl plate and provided with a washer 29 on the inner side, as shown in Fig. 10. The outer end portion 30 of the pin is cross-sectionally shaped like its inner end portion and makes snug engagement with a correspondingly shaped socket or opening in a tripping finger 31 which is held on the pin by a cap screw 32 threaded axially into the pin with a washer 33 overlying the margins of the opening. It will be evident that by this arrangement the tripping finger and pawl are connected for rotation together in the opening in pawl plate 5 so that entry of the nose of the pawl into one or another of the shouldered pockets 23 of the cam track 22, or positioning of the nose so as to be clear of the pockets and ride on the dwells 24, all during relative rotation of the pawl plate and the pulley assembly in which the cam plate is fixed, may be controlled by turning the tripping finger 31.

The mechanism includes means for yieldably biasing the tripping finger so as to urge the cam nose into seating position into one or another of the pockets 23, i. e., for biasing the tripping finger, and hence the pawl also, to swing on the pivot pin 26 out toward the periphery of the pawl plate 5. For this purpose the inner surface of the tripping finger is counterbored around the pivot pin opening, and a light coil spring 34 is disposed in the counterbore so as to surround the pivot pin and has its opposite ends bent right-angularly and inserted into holes drilled in the pawl plate and tripping finger, respectively, with the spring pre-tensioned, as by rotating the tripping finger before the pin with pawl attached is pushed into the tripping finger opening, so that the spring will exert the required biasing action on the finger and pawl.

It will be evident from the foregoing that with the pulley assembly driven, as by the belt 21, the pawl plate 5, and hence the shaft 1 to which the pawl plate is fast, will normally be driven by the coupling of the pawl plate to the pulley assembly resulting from the seating of the pawl nose in one of the pockets 23 under the influence of the spring 34 and that the pulley assembly and pawl plate can be uncoupled, to disconnect the driving pulley assembly from the shaft, by simply turning the tripping finger against the action of spring 34 so as to swing the pawl nose out of a pocket 23 and cause it to ride on the dwells 24. This turning of the tripping finger may be effected by actuating mechanism which will now be described.

As shown in Figs. 1, 2 and 3, the shaft 1 may be journaled in a bearing 35 mounted on a bracket 36 between the clutch mechanism and any member, designated 37, which is to be driven. The bracket includes a vertical flange, preferably duplicated on both sides of the bearing so that either side may be used to support a shelf 38 which is bolted to the bracket. To this shelf is secured a horizontal plate 39 made adjustable in four directions, axially of the shaft 1 both toward and away from the clutch, and radially both toward and away from the shaft, by clamping bolts 40 standing through right-angularly related crossing slots 41 in the shelf and 42 in the plate.

Fixed to the plate 39 is a solenoid 43 from which a plunger 44 extends toward the clutch and parallel to the shaft 1. The free end of the plunger is kerfed to receive the right-angularly inturned end 45 of an actuating arm 46 which projects radially toward the shaft 1 and is secured to the plunger by a pair of pins which penetrate the kerf in the plunger and the tripping arm end 45 seated therein. The inner of these pins is extended somewhat beyond the plunger periphery to provide an abutment for a coil spring 48 which is wrapped around the plunger and reacts in tension between the pin and the adjacent end of the solenoid to urge the plunger outwardly from the solenoid. A bumper or guide in the form of a small plate 49 may be bolted to the plate 39 so that the inturned end 45 of the arm 46 may slide along it as the arm moves over the plate 39 toward the clutch under the influence of the spring 48 or back away from the clutch when the spring tension is overcome by energization of the solenoid.

The free end of of the arm 46 is turned back to form an actuating finger 50 parallel to the inturned end 45 of the arm. This finger is positioned, by properly adjusting the bolts 40 in the slots 41 and 42 in the shelf 38 and plate 39, to slide along the edge of the shelf sufficiently near the clutch so as to lie in the path of the tripping finger 31 when the arm 46 is projected by the spring 48 and to be removed from that path when the arm is retracted by energization of the solenoid. That is to say, the adjustment is such that when the pawl plate 5 rotates the tripping finger will strike the actuating finger if the solenoid is deenergized but will not strike the finger if the solenoid has been energized to retract the plunger 44. This clearance can be assured by notching out the corner of the plate 39 nearest the clutch and tripping finger, as shown in Fig. 1.

The operation of the devices constructed and arranged as above is as follows:

The pulley assembly is driven, as by the belt 21, so as to rotate in the direction shown by the arrow in Fig. 2. Since the assembly is not splined or otherwise directly coupled to the shaft 1, but is capable of being coupled to the shaft only through the medium of pawl plate 5 which is fast on the shaft, rotation of the pulley assembly is communicated to the shaft only if and when the assembly becomes coupled to the pawl plate. This coupling is effected by means of the pawl 25 becoming seated in one or another of the cam track pockets 23 in the cam plate 4 of the pulley assembly. While spring 34 tends to rotate the pawl 25 to turn the pawl nose into a pocket 23, this rotation may be prevented or limited by holding the tripping finger 31 against the tendency of the spring to turn it. Such prevention is accomplished by the actuating arm finger 50 when the arm is projected into the path of the tripping finger, and the arm is thus projected by the spring 48 at all times when the solenoid is deenergized.

Assuming that the solenoid is deenergized, the finger 50 stands projected into the path of tripping finger 31 and turns the finger back, against the tension of spring 34, so as to lift the nose of pawl 25 out of any pocket 23 in which the spring may have seated it, so that the pulley assembly may continue to rotate with the pawl nose riding on the dwells 24 of the track in the cam plate 4, passing over all the pockets in succession, while the pawl plate 5 remains stationary. Hence the shaft 1, on which the pawl plate is fast, is uncoupled from the pulley assembly and does not rotate. This position of the parts is shown in Figs. 11 and 12.

To couple the shaft to the pulley assembly the solenoid is energized. This retracts the arm 46, withdrawing the finger 50 from beneath the finger 31 and permitting spring 34 to press the nose of pawl 25 into the next pocket 23 to meet the pawl as the cam plate 4 continues to turn. With the pawl seated in the pocket, the shoulder of the pocket catches the pawl nose and makes driving connection therewith, thus coupling the pawl plate and the shaft to the pulley assembly so that the shaft rotates with the pulley assembly. This coupled position of the parts is shown in Figs. 15 and 16.

In the coupled position, the pawl plate rotates, the tripping finger clearing the edge of the plate 39 and shelf 38. Uncoupling is accomplished by deenergizing the solenoid to project the arm 46 so that the finger 50 will catch the tripping finger 31 and raise it enough to lift the pawl nose out of the pocket in which it is caught, as has been explained.

It will be recognized that when the finger 50 is projected the tripping finger 31 would normally bear against it with a pressure that is a direct function of the tension that has been wound into spring 34. This tension should be fairly heavy in order to make certain the seating of the pawl nose into the pocket next approaching after the solenoid is energized. But such pressure of the tripping finger on the finger 50 would impose a considerable load on the solenoid which, added to the force required to compress the spring 48, would require a heavy duty solenoid of several pounds pull to insure unfailing, dependable actuation. It would be obviously wasteful of electrical energy to keep such a solenoid energized at its full current consumption while the clutch is engaged.

A novel feature of the invention permits the use of a light solenoid which is required to exert only enough pull, amounting to only a few ounces, to compress the spring 48 and not to overcome also the pressure of the tripping finger 31 on the finger 50. This is accomplished by adjusting the parts so that when the arm 46 is projected the nose of pawl 25 will descend very slightly into each of the pockets 23 and will strike the curved rise 51 by which the pocket merges into the dwell 24. The cam nose is appropriately curved so that this impingement of the nose on the curved rise will lift the pawl slightly, so as to cause the pawl nose to ride on the dwell, thereby lifting the tripping finger 31 slightly from the finger 50 until the next pocket 23 is reached and the pawl nose descends partially into it only to rise again as the nose strikes the next rise 51 and rises to ride the ensuing dwell 24. Thus tripping finger 31 flutters, or rises periodically from the finger 50, as shown in Figs. 13 and 14, as the pulley assembly rotates during disengagement of the clutch. If the solenoid be energized its plunger and arm 46 will be retracted by the very small force required merely to compress the spring 48 and overcome the slight friction of the weight of the arm 46 on the plate 39 on the next ensuing rise of the tripping finger 31 from the actuating finger 50.

In the embodiment selected to illustrate the invention in Figs. 1–16 the pulley assembly is the driving member and rotates counterclockwise as viewed in Fig. 2. To adapt the clutch for pulley rotation in the opposite direction, the cam plate 4 is reversed on face plate 3, which involves simply removing the screws 13, turning the cam plate over, and rescrewing it in place. The shoulders of the pockets 23 thus face oppositely from their Fig. 5 positions, as shown in Fig. 19. For the pawl 25 and tripping finger 31 there are substituted entirely similar but reversely directed elements 25a and 31a. The solenoid assembly is mounted on the opposite side of the bracket 36, as shown in Figs. 17 and 18. The plate 39 can be used, turned over side for side, and an actuating arm similar to the arm 46 but with its parts relatively reversed, as shown at 46a in Figs. 17 and 18, is connected to the plunger 44.

As has been explained hereinabove, an important feature of the invention is the versatility and adaptability of the clutch and actuating mechanism to be used, with slight and easily made changes, not only for reverse driving rotation of the pulley as has just been described, but also for using the pulley as the driven member. Figs. 20, 21 and 22 show the parts arranged in the latter way.

To effect this arrangement the parts are disassembled and reassembled in the relationship best shown in Fig. 22. This involves removing the hub 7 from face plate 3 and the hub 17 from pawl plate 5. The hub 17 is then pressed into the face plate 3 in such a way that the flange 20 of the hub lies within the large central opening of the cam plate 4. The face plate lugs 14 of course connect the cam plate to the face plate, and this assembly is made fast on the shaft 1, as by means of the setscrew in the hub 17, so that rotation of the shaft will make the assembly the driving member. The pulley 2, with its hub 6 mounted loose on the shaft, is faced against the cam plate as shown in Fig. 22 and held against axial displacement by the collar 16. The pawl 25 and tripping arm 31 are mounted on opposite faces of the pulley, with the pawl in the plane of the cam plate and the tripping arm on the outer face of the pulley, by means of a pivot pin 26a which is identical with the pin 26 except that it may be sufficiently longer to extend through the pulley if the pulley is thicker than the pawl plate 5. If required for the same reason, a longer bushing 26a may be substituted for the bushing 28. The pulley is perforated, as shown at 52 in Fig. 7, and provided with an adjacent small hole, to pass the bushing and hold the downturned end of pawl-biasing spring 34. The actuating mechanism may be mounted as shown in Fig. 20, which will be recognized as the same mounting that is shown in Fig. 1.

It will be evident that in this arrangement of the parts rotation of the shaft 1 will turn the cam plate 3 as the driving member and the pulley 2 will be rotated as the driven member only when finger 50 of the arm 46 is retracted from the path of the tripping finger 31 so that the spring 34 is free to swing the nose of the pawl 25 into one or another of the pockets 23, and that when the tripping finger is caught by projection of the finger into its rotational path the pawl nose will be lifted from the cam pocket and the pulley will be held against rotation while the shaft and cam plate continue to turn.

The foregoing assembly is designed for driving rotation of the shaft in a counterclockwise direction as viewed in Fig. 21. The parts can easily be rearranged for driving rotation of the shaft in a clockwise direction by simply turning the cam plate over to its Fig. 19 position and using the parts and arrangement shown in Fig. 18, as is believed to be evident.

Any pulley selected from a considerable range of sizes can be substituted for connection to the face plate 3 in Figs. 1–19, or can be used to replace the pulley in Figs. 20–22.

The clutch is well adapted to include multiple pulleys, as it is believed will be evident from Fig. 8. Any reasonable number of additional pulleys can be mounted in the assembly by nesting the hub flange 6 of each pulley 2 in the counterbore 11 of the next adjacent pulley and substituting appropriately longer bolts for bolts 12 of the length shown in Fig. 8.

Moreover, the assembly is adapted for use on shafts of various diameters within a wide range provided the hub bores in the pulley, face plate and pawl plate are initially made large enough to accommodate hubs 6, 7 and 17 having the respective outer diameters shown in Fig. 8 and bored for different internal diameters to fit the desired range of shaft sizes.

It will be recognized that the mechanism comprises a minimum number of parts that are subject to wear and that it is easily lubricated and disassembled for cleaning, repair or replacement of parts.

The invention may be incorporated in specific forms other than that of the preferred embodiment which has been illustrated in the drawings and described in the foregoing specification, and it is to be understood that all such other forms, to the extent that they apply the principles of the invention as defined in the appended claims, are to be deemed within the scope and purview thereof.

We claim:

1. A clutch comprising rotatable driving and driven members, a cam track rotatable with one of the members having a depressed shouldered pocket and a raised dwell connected by a curved contour, a pawl rotatable with the other member, tripping means operatively connected to the pawl, means biasing the pawl into the pocket for coupling the members, and actuating means movable into the rotational path of the tripping means to a limit at which the actuating means will lift the pawl out of the pocket and direct the pawl onto the curved contour so that on further rotation of the cam track the pawl will rise on riding engagement with the dwell and thereby lift the tripping means from engagement with the actuating means.

2. A clutch as claimed in claim 1, in which the cam track includes a plurality of equidistantly spaced depressed shouldered pockets and intervening raised dwells arranged circumferentially around one of the members, whereby the tripping means will be lifted from engagement with the actuating means a plurality of times during each rotation of the cam track when the actuating means is positioned at substantially the limit of its movement into the rotational path of the tripping means.

3. In a clutch mechanism, a shaft, a driving and a driven member mounted thereon, means making one of said members fast on the shaft, the other member being loose on the shaft, a cam track having a depressed shouldered pocket and a raised dwell fast on one of said members, a pawl fast on the other member, means biasing the pawl into the pocket for coupling the members, and actuating means movable into and retractible from a position operatively engaging the pawl to lift the pawl out of said pocket and direct the pawl onto the dwell, the height of the dwell being sufficient to separate the pawl from said operative engagement with the actuating means.

4. In a clutch mechanism as claimed in claim 3, tripping means connected to and movable with the pawl for effecting contact with the actuating means for lifting the pawl out of the pocket and for becoming disengaged from the actuating means when the pawl rides on the dwell.

5. In a clutch mechanism, a shaft, a member carrying a cam track having a depressed shouldered pocket and a raised dwell, means mounting said member on the shaft and adjustable to fix the member fast on the shaft or loose thereon, a second member, means mounting said second member on the shaft and adjustable to fix the second member fast on the shaft or loose thereon, a pawl carried by said second member, means biasing the pawl into the pocket for coupling the members, actuating means movable into and retractible from a position operatively engaging the pawl to lift the pawl out of said pocket and direct the pawl onto the dwell for uncoupling the members, and tripping means connected to and movable with the pawl for effecting contact with the actuating means for lifting the pawl out of the pocket and for becoming disengaged from the actuating means when the pawl rides on the dwell.

6. A clutch mechanism as claimed in claim 1, including electromagnet means for moving the actuating means.

7. A clutch mechanism as claimed in claim 1, including a spring biasing the actuating means to move into operative connection with the pawl and electromagnetic means for retracting the actuating means against the force of said spring.

8. A clutch mechanism as claimed in claim 1, including electromagnet means for moving the actuating means.

9. A clutch mechanism as claimed in claim 1, including a spring biasing the actuating means to move to said limit and electromagnetic means for retracting the actuating means against the force of said spring.

10. In a clutch of the type in which a pawl carried by one member is biased into clutching engagement with a shoulder in a cam track carried by another member, the combination of a dwell on the cam track connected with said shoulder by a sloping contour, tripping means carried by the pawl, and actuating means movable between one limit out of engagement with the tripping means and another limit in which the actuating means holds the tripping means in a position in which the pawl becomes engaged by said sloping contour on each revolution of the member carrying the cam track whereby the pawl is lifted on to the dwell and the tripping means is lifted from the actuating means.

11. The combination claimed in claim 10 in which the actuating means is movable rectilinearly along a line and in which the two clutch members are mounted on an axis parallel to that line.

12. The combination claimed in claim 10 in which the pawl and cam track are carried on the opposite faces of respective disks which are mounted on a common axis.

13. The combination claimed in claim 10 in which the pawl and cam track are carried on the opposite faces of respective disks which are mounted on a common axis and in which the actuating means is movable rectilinearly along a line parallel to said axis.

References Cited in the file of this patent

UNITED STATES PATENTS

| | | |
|---|---|---|
| 477,985 | Bender | June 28, 1892 |
| 577,247 | Geb | Feb. 16, 1897 |
| 887,544 | Taft | May 12, 1908 |
| 1,057,132 | Einicher | Mar. 25, 1913 |
| 1,119,967 | Landsiedel | Dec. 8, 1914 |
| 1,139,443 | Peterson | May 11, 1915 |
| 1,146,135 | Caughey | July 13, 1915 |
| 1,165,407 | Havener | Dec. 28, 1915 |
| 1,765,527 | Gollnick et al. | June 24, 1930 |
| 2,326,611 | Borsmeyer | Aug. 10, 1943 |
| 2,368,892 | Skoog | Feb. 6, 1945 |
| 2,369,292 | Friedman | Feb. 13, 1945 |